United States Patent
Miller et al.

(10) Patent No.: US 9,666,844 B2
(45) Date of Patent: May 30, 2017

(54) SUPPORT STRUCTURE FOR ANGLED BATTERY CELL CONFIGURATION FOR A TRACTION BATTERY ASSEMBLY

(71) Applicant: Ford Global Technologies, LLC, Dearborn, MI (US)

(72) Inventors: Daniel Miller, Dearborn, MI (US); Brian Utley, Canton, MI (US); Evan Mascianica, Ann Arbor, MI (US); Josef Dollison, Petersburg, MI (US); Jeremy Samborsky, Livonia, MI (US); Judith Urdea, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 265 days.

(21) Appl. No.: 14/468,616

(22) Filed: Aug. 26, 2014

(65) Prior Publication Data
US 2016/0064709 A1    Mar. 3, 2016

(51) Int. Cl.
| | | |
|---|---|---|
| *H01M 2/10* | (2006.01) | |
| *H01M 10/6554* | (2014.01) | |
| *H01M 10/6566* | (2014.01) | |
| *H01M 10/6567* | (2014.01) | |

(52) U.S. Cl.
CPC ..... *H01M 2/1077* (2013.01); *H01M 10/6554* (2015.04); *H01M 10/6566* (2015.04); *H01M 10/6567* (2015.04); *H01M 2220/20* (2013.01)

(58) Field of Classification Search
None
See application file for complete search history.

(56) References Cited

U.S. PATENT DOCUMENTS

| | | | |
|---|---|---|---|
| 5,589,290 | A  | 12/1996 | Klink et al. |
| 5,756,227 | A  | 5/1998  | Suzuki et al. |
| 6,335,116 | B1 | 1/2002  | Yamane et al. |
| 6,551,740 | B1 | 4/2003  | Melichar |
| 6,709,783 | B2 | 3/2004  | Ogata et al. |
| 7,070,015 | B2 | 7/2006  | Mathews et al. |
| 7,147,963 | B2 | 12/2006 | Kimoto et al. |
| 7,795,845 | B2 | 9/2010  | Cho |
| 7,883,793 | B2 | 2/2011  | Niedzwiecki et al. |

(Continued)

FOREIGN PATENT DOCUMENTS

| | | |
|---|---|---|
| EP | 2403032 A1    | 1/2012 |
| WO | 2013133632 A1 | 9/2013 |

*Primary Examiner* — Alix Eggerding
(74) *Attorney, Agent, or Firm* — David B. Kelley; Brooks Kushman P.C.

(57) ABSTRACT

A support structure is provided for a battery cell array which may include a pair of triangular prism shaped endplates having opposing parallel inner faces configured to exert a compression force on battery cells disposed therebetween and parallel outer faces not parallel with the inner faces. The support structure may also include a pair of opposing retention supports spanning between the endplates. The endplates and supports may be arranged such that the outer faces and supports define a rectangular prism. The inner faces may be oriented at an acute angle relative to at least one of the supports, and the acute angle may have a slippage angle value. Each retention support may define retention featured to orient battery cells and cell spacers such that the battery cells and spacers are parallel with the inner faces.

16 Claims, 9 Drawing Sheets

(56) References Cited

U.S. PATENT DOCUMENTS

| | | | |
|---|---|---|---|
| 2002/0028376 A1 | 3/2002 | Yamane et al. | |
| 2005/0250006 A1* | 11/2005 | Kim | H01M 2/18 429/160 |
| 2006/0115721 A1* | 6/2006 | Lee | H01M 10/4207 429/156 |
| 2009/0142628 A1* | 6/2009 | Okada | H01M 2/0237 429/8 |
| 2012/0188714 A1 | 7/2012 | Von Borck et al. | |
| 2012/0189902 A1* | 7/2012 | Kim | H01M 2/1022 429/159 |
| 2013/0149591 A1* | 6/2013 | Byun | H01M 2/1077 429/159 |

\* cited by examiner

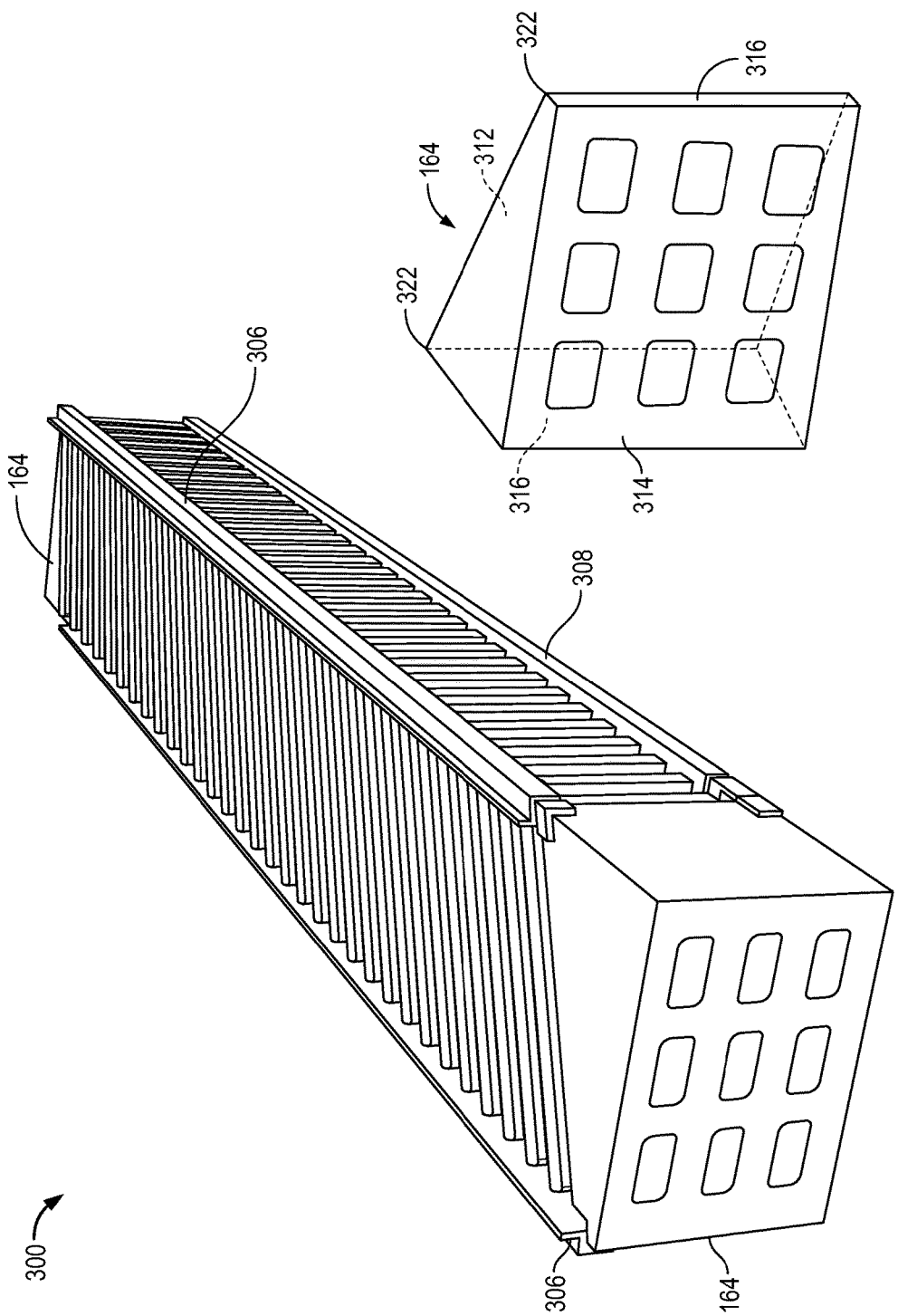

SUPPORT STRUCTURE FOR ANGLED BATTERY CELL CONFIGURATION FOR A TRACTION BATTERY ASSEMBLY

TECHNICAL FIELD

This disclosure relates to thermal management systems and battery cell configurations for high voltage batteries utilized in vehicles.

BACKGROUND

Vehicles such as battery-electric vehicles (BEVs), plug-in hybrid-electric vehicles (PHEVs), mild hybrid-electric vehicles (MHEVs), or full hybrid-electric vehicles (FHEVs) contain an energy source, such as a high voltage (HV) battery, to act as a propulsion source for the vehicle. The HV battery may include components and systems to assist in managing vehicle performance and operations. The HV battery may include one or more arrays of battery cells interconnected electrically between battery cell terminals and interconnector busbars. The HV battery and surrounding environment may include a thermal management system to assist in managing temperature of the HV battery components, systems, and individual battery cells.

SUMMARY

A support structure for a battery cell array includes a pair of triangular prism shaped endplates having opposing parallel inner faces configured to exert a compression force on battery cells disposed therebetween and parallel outer faces not parallel with the inner faces. The support structure also includes a pair of opposing retention supports spanning between the endplates. The endplates and supports are arranged such that the outer faces and supports define a rectangular prism. The inner faces may be oriented at an acute angle relative to at least one of the supports, and the acute angle may have a slippage angle value. The slippage angle value may be based on a surface coefficient of friction of a battery tray arranged to support the battery cells and an amount of the compression force applied by the endplates to a plurality of cells disposed therebetween and supported by the battery tray. Each retention support may define a retention feature having a first portion secured to the respective inner corner, a second portion having a spacer guide to receive and orient a corner portion of a cell spacer such that the spacer is parallel with the inner faces, and a third portion having a cell guide to receive and orient a corner portion of a battery cell such that the cell is parallel with the inner faces. Each retention support may further define a plurality of alternating first and second guides between the opposing inner corners. A plurality of cell spacers may be disposed between the endplates and may have corners oriented by the first guides such that the spacers are parallel to the inner faces. The cell spacers may define a plurality of ribs spaced apart at vertical intervals and extending outward on both sides of the spacer. The support structure may also include a thermal plate disposed below a battery cell region between the endplates and a plurality of cell spacers. The plurality of cell spacers may be disposed between the endplates and may have upper corners retained by the first guides and lower corners in at least partial contact with the thermal plate, and oriented such that the spacers are parallel to the inner faces.

A support structure for a battery cell array includes a pair of wedge shaped endplates each having inner corners and a pair of retention supports extending between the inner corners. The endplates and supports are configured such that the endplates exert a compression force on battery cells disposed therebetween in a direction other than a direction defined by the supports. The endplates each may further have outer faces parallel to one another, inner faces parallel to one another and oriented at an acute angle relative to the respective outer faces, at least one side face extending between the outer and inner faces, and upper faces. The inner corners may each be defined by an intersection of the respective inner face, upper face, and side face. The supports may each define a plurality of first guides sized to receive and orient a portion of a corner of a cell spacer such that the spacer is parallel to the inner faces. The supports may each further define a plurality of second guides sized to receive and orient a portion of a corner of a battery cell such that the battery cell is parallel to the inner faces. A pair of outer spacers may each be adjacent to the respective inner faces, oriented parallel to the inner faces, and at least partially disposed within four of the first guides adjacent the inner corners of the endplates. A plurality of inner spacers may be spaced apart at intervals between the pair of outer spacers, oriented parallel to the inner faces, and at least partially disposed within the other of the first guides between the four of the first guides adjacent the inner corners. The endplates and retention supports may be arranged to retain and orient a plurality of battery cells therebetween such that the plurality of battery cells are parallel to the inner faces. The endplates may each define an inner face oriented at an angle relative to the retention supports equal to a slippage angle value dictated by a surface coefficient of friction of a battery tray arranged to support the battery cells and an amount of the compression force. The retention supports may each define a plurality of first guides sized to receive a portion of a plurality of corners of cell spacers such that the spacer is oriented at the angle and such that passageways defined between the cell spacers provide a path for airflow.

A traction battery assembly includes a pair of endplates having a triangular prism shape, a pair of upper rails, and a plurality of cell spacers. The pair of upper rails extends between each of the endplates and defines a plurality of first guides sized to receive a portion of an upper corner of a spacer. The plurality of cell spacers are disposed between the endplates and diagonally arranged such that the spacers are oriented at an acute angle relative to the upper rails and such that at least a portion of the upper corners of the spacers are retained by the first guides. The pair of upper rails may each further define a plurality of second guides sized to receive a portion of an upper corner of a battery cell such that a front face of the battery cell is oriented parallel to a front face of the cell spacers. The cell spacers may be arranged to define a plurality of airflow passageways between one another and diagonally oriented relative to the upper rails. A pair of lower rails may extend between each of the endplates and may define a plurality of shingle fittings sized to receive a portion of a lower corner of a battery cell. A pair of lower rails may extend between each of the endplates and may define a plurality of shingle fittings sized to receive a portion of a lower corner of a spacer. The acute angle may have a slippage angle value based on a surface coefficient of friction of a battery tray supporting the assembly and an amount of compression force applied by the endplates to a plurality of cells disposed therebetween and supported by the battery tray.

BRIEF DESCRIPTION OF THE DRAWINGS

FIG. 5 is a perspective view of a portion of a support structure for the portion of the traction battery assembly of FIG. 4A.

FIG. 6A is a perspective view of an endplate of the support structure of FIG. 5.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
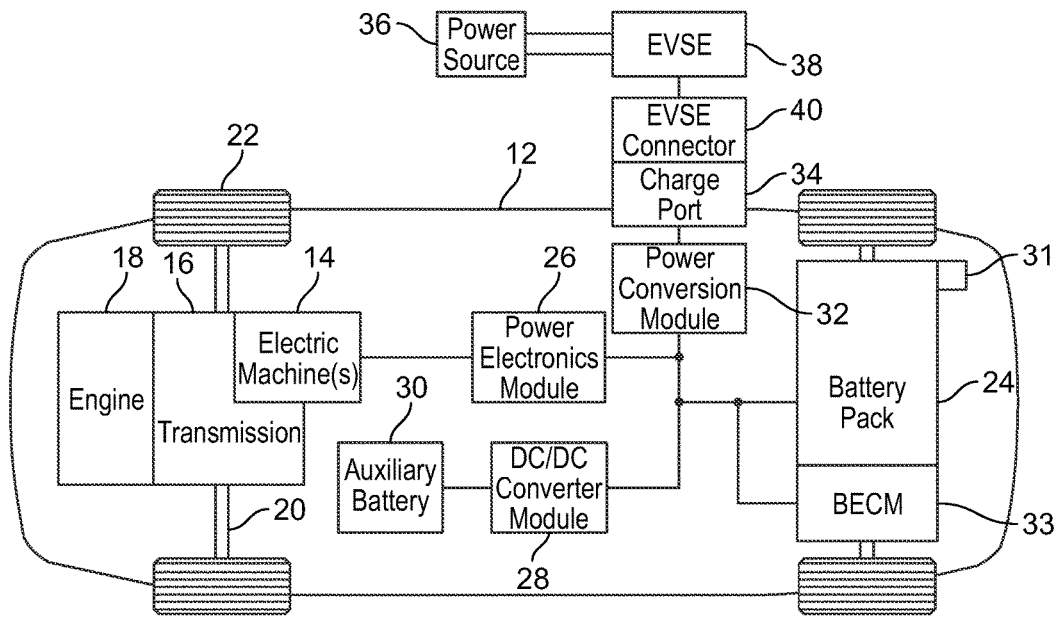
FIG. 1 is a schematic illustration of a battery electric vehicle.

FIG. 1 depicts a schematic of a typical plug-in hybrid-electric vehicle (PHEV). A typical plug-in hybrid-electric vehicle 12 may comprise one or more electric machines 14 mechanically connected to a hybrid transmission 16. The electric machines 14 may be capable of operating as a motor or a generator. In addition, the hybrid transmission 16 is mechanically connected to an engine 18. The hybrid transmission 16 is also mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy that would normally be lost as heat in the friction braking system. The electric machines 14 may also provide reduced pollutant emissions since the hybrid-electric vehicle 12 may be operated in electric mode or hybrid mode under certain conditions to reduce overall fuel consumption of the vehicle 12.

A traction battery or battery pack 24 stores and provides energy that can be used by the electric machines 14. The traction battery 24 typically provides a high voltage DC output from one or more battery cell arrays, sometimes referred to as battery cell stacks, within the traction battery 24. The battery cell arrays may include one or more battery cells. The traction battery 24 is electrically connected to one or more power electronics modules 26 through one or more contactors (not shown). The one or more contactors isolate the traction battery 24 from other components when opened and connect the traction battery 24 to other components when closed. The power electronics module 26 is also electrically connected to the electric machines 14 and provides the ability to bi-directionally transfer electrical energy between the traction battery 24 and the electric machines 14. For example, a typical traction battery 24 may provide a DC voltage while the electric machines 14 may require a three-phase AC voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads, such as compressors and electric heaters, may be connected directly to the high-voltage without the use of a DC/DC converter module 28. In a typical vehicle, the low-voltage systems are electrically connected to an auxiliary battery 30 (e.g., 12V battery).

A battery electronic control module (BECM) 33 may be in communication with the traction battery 24. The BECM 33 may act as a controller for the traction battery 24 and may also include an electronic monitoring system that manages temperature and state of charge of each of the battery cells. The traction battery 24 may have a temperature sensor 31 such as a thermistor or other temperature gauge. The temperature sensor 31 may be in communication with the BECM 33 to provide temperature data regarding the traction battery 24. The temperature sensor 31 may also be located on or near the battery cells within the traction battery 24. It is also contemplated that more than one temperature sensor 31 may be used to monitor temperature of the battery cells.

The vehicle 12 may be, for example, an electric vehicle such as a PHEV, a FHEV, a MHEV, or a BEV in which the traction battery 24 may be recharged by an external power source 36. The external power source 36 may be a connection to an electrical outlet. The external power source 36 may be electrically connected to electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34.

The various components discussed may have one or more associated controllers to control and monitor the operation of the components. The controllers may communicate via a serial bus (e.g., Controller Area Network (CAN)) or via discrete conductors.

The battery cells, such as a prismatic cell, may include electrochemical cells that convert stored chemical energy to electrical energy. Prismatic cells may include a housing, a positive electrode (cathode) and a negative electrode (anode). An electrolyte may allow ions to move between the anode and cathode during discharge, and then return during recharge. Terminals may allow current to flow out of the cell for use by the vehicle. When positioned in an array with multiple battery cells, the terminals of each battery cell may be aligned with opposing terminals (positive and negative) adjacent to one another and a busbar may assist in facilitating a series connection between the multiple battery cells. The battery cells may also be arranged in parallel such that similar terminals (positive and positive or negative and negative) are adjacent to one another. For example, two battery cells may be arranged with positive terminals adjacent to one another, and the next two cells may be arranged with negative terminals adjacent to one another. In this example, the busbar may contact terminals of all four cells.

The traction battery 24 may be heated and/or cooled using a liquid thermal management system, an air thermal management system, or other method as known in the art. In one example of a liquid thermal management system and now referring to FIG. 2, the traction battery 24 may include a battery cell array 88 shown supported by a thermal plate 90 to be heated and/or cooled by a thermal management system. The battery cell array 88 may include a plurality of battery cells 92 positioned adjacent to one another and structural components. The DC/DC converter module 28 and/or the BECM 33 may also require cooling and/or heating under certain operating conditions. A thermal plate 91 may support the DC/DC converter module 28 and BECM 33 and assist in thermal management thereof. For example, the DC/DC converter module 28 may generate heat during voltage conversion which may need to be dissipated. Alternatively, thermal plates 90 and 91 may be in fluid communication with one another to share a common fluid inlet port and common outlet port.

In one example, the battery cell array 88 may be mounted to the thermal plate 90 such that only one surface, of each of the battery cells 92, such as a bottom surface, is in contact with the thermal plate 90. The thermal plate 90 and individual battery cells 92 may transfer heat between one another to assist in managing the thermal conditioning of the battery cells 92 within the battery cell array 88 during vehicle operations. Uniform thermal fluid distribution and high heat transfer capability are two thermal plate 90 considerations for providing effective thermal management of the battery cells 92 within the battery cell arrays 88 and other surrounding components. Since heat transfers between thermal plate 90 and thermal fluid via conduction and convection, the surface area in a thermal fluid flow field is important for effective heat transfer, both for removing heat and for heating the battery cells 92 at cold temperatures. For example, charging and discharging the battery cells generates heat which may negatively impact performance and life of the battery cell array 88 if not removed. Alternatively, the thermal plate 90 may also provide heat to the battery cell array 88 when subjected to cold temperatures.

Figure 2:
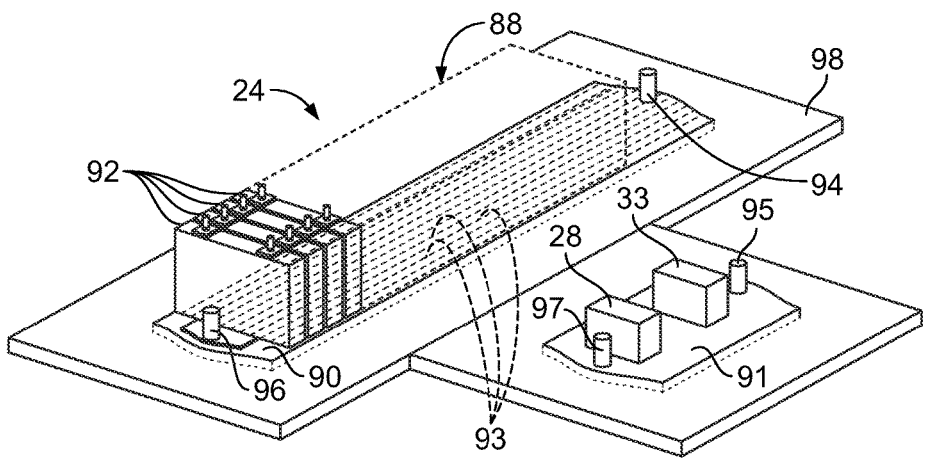
FIG. 2 is a perspective view of a portion of a thermal management system for the traction battery of the vehicle in FIG. 1.

The thermal plate 90 may include one or more channels 93 and/or a cavity to distribute thermal fluid through the thermal plate 90. For example, the thermal plate 90 may include an inlet port 94 and an outlet port 96 that may be in communication with the channels 93 for providing and circulating the thermal fluid. Positioning of the inlet port 94 and outlet port 96 relative to the battery cell arrays 88 may vary. For example and as shown in FIG. 2, the inlet port 94 and outlet port 96 may be centrally positioned relative to the battery cell arrays 88. The inlet port 94 and outlet port 96 may also be positioned to the side of the battery cell arrays 88. Alternatively, the thermal plate 90 may define a cavity (not shown) in communication with the inlet port 94 and outlet port 96 for providing and circulating the thermal fluid. The thermal plate 91 may include an inlet port 95 and an outlet port 97 to deliver and remove thermal fluid. Optionally, a thermal interface material (not shown) in the form of, for example, a sheet, paste, glue or adhesive, may be applied to the thermal plate 90 and/or 91 below the battery cell array 88 and/or the DC/DC converter module 28 and BECM 33, respectively. The sheet of thermal interface material may enhance heat transfer between the battery cell array 88 and the thermal plate 90 by filling, for example, voids and/or air gaps between the battery cells 92 and the thermal plate 90. The thermal interface material may also provide electrical insulation between the battery cell array 88 and the thermal plate 90. A battery tray 98 may support the thermal plate 90, the thermal plate 91, the battery cell array 88, and other components. The battery tray 98 may include one or more recesses to receive thermal plates.

Different battery pack configurations may be available to address individual vehicle variables including packaging constraints and power requirements. The battery cell array 88 may be contained within a cover or housing (not shown) to protect and enclose the battery cell array 88 and other surrounding components, such as the DC/DC converter module 28 and the BECM 33. The battery cell array 88 may be positioned at several different locations including below a front seat, below a rear seat, or behind the rear seat of the vehicle, for example. However, it is contemplated the battery cell array 88 may be positioned at any suitable location in the vehicle 12.

Figure 3A:
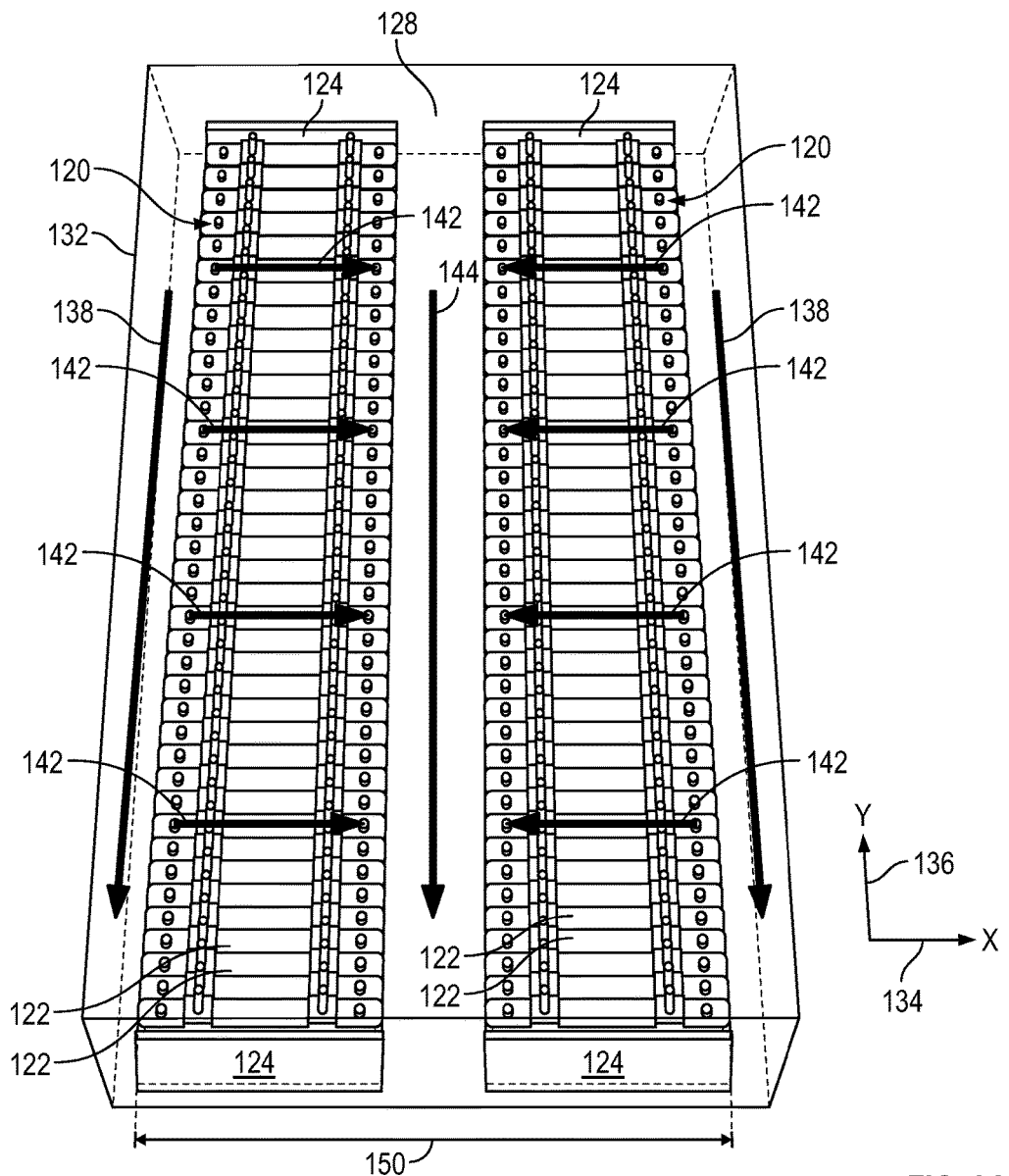
FIG. 3A is a perspective view of a portion of a traction battery assembly having an air thermal management system.
Figure 3B:
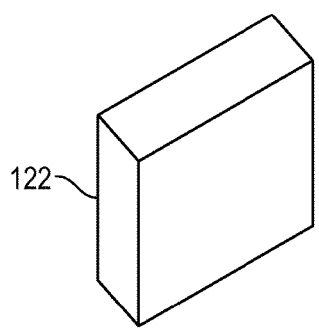
FIG. 3B is a perspective view of a battery cell from the portion of the traction battery assembly of FIG. 3A.

FIG. 3A shows an example of a portion of a traction battery assembly having an air thermal management system and pair of battery cell arrays 120 spaced apart from one another. The battery cell arrays 120 may include a plurality of battery cells 122 as shown in FIG. 3B. The battery cells 122 are arranged in a somewhat traditional stacked orientation. A pair of endplates 124 may be located at opposing end faces of the battery cell arrays 120 and may assist in retaining the battery cells 122 therebetween. For example, the endplates 124 may be arranged with the respective battery cell arrays 120 such that a compression force is applied at the opposing end faces of the battery cell arrays 120. The battery cell arrays 120 may be secured to, for example, a battery tray 128. A portion of a traction battery housing 132 is shown which may house the battery cell arrays 120 and endplates 124. An X-direction arrow 134 may represent a forward and rear direction of a vehicle including the battery cell arrays 120. A Y-direction arrow 136 may represent a side to side direction of the vehicle. In this example, the battery cells 122 of the two battery cell arrays 120 are oriented in a rectangular formation for cooling by the air thermal management system. In this rectangular formation, arrows 138 show examples of airflow paths entering the traction battery housing 132 and traveling in the Y-direction along the outer portions of the traction battery housing 132. Arrows 142 show examples of airflow paths traveling in the X-direction across and between the battery cells 122 to, for example, assist in cooling the battery cells 122. As shown, the airflow navigates an approximately ninety degree turn to travel in the X-direction. Arrow 144 shows an example of an airflow path for air exiting the traction battery housing 132 in the Y-direction after navigating another approximately ninety degree turn from the air travel across the battery cells 122. The two battery cell arrays 120 define an X-length equal to a dimension 150.

Figure 4A:
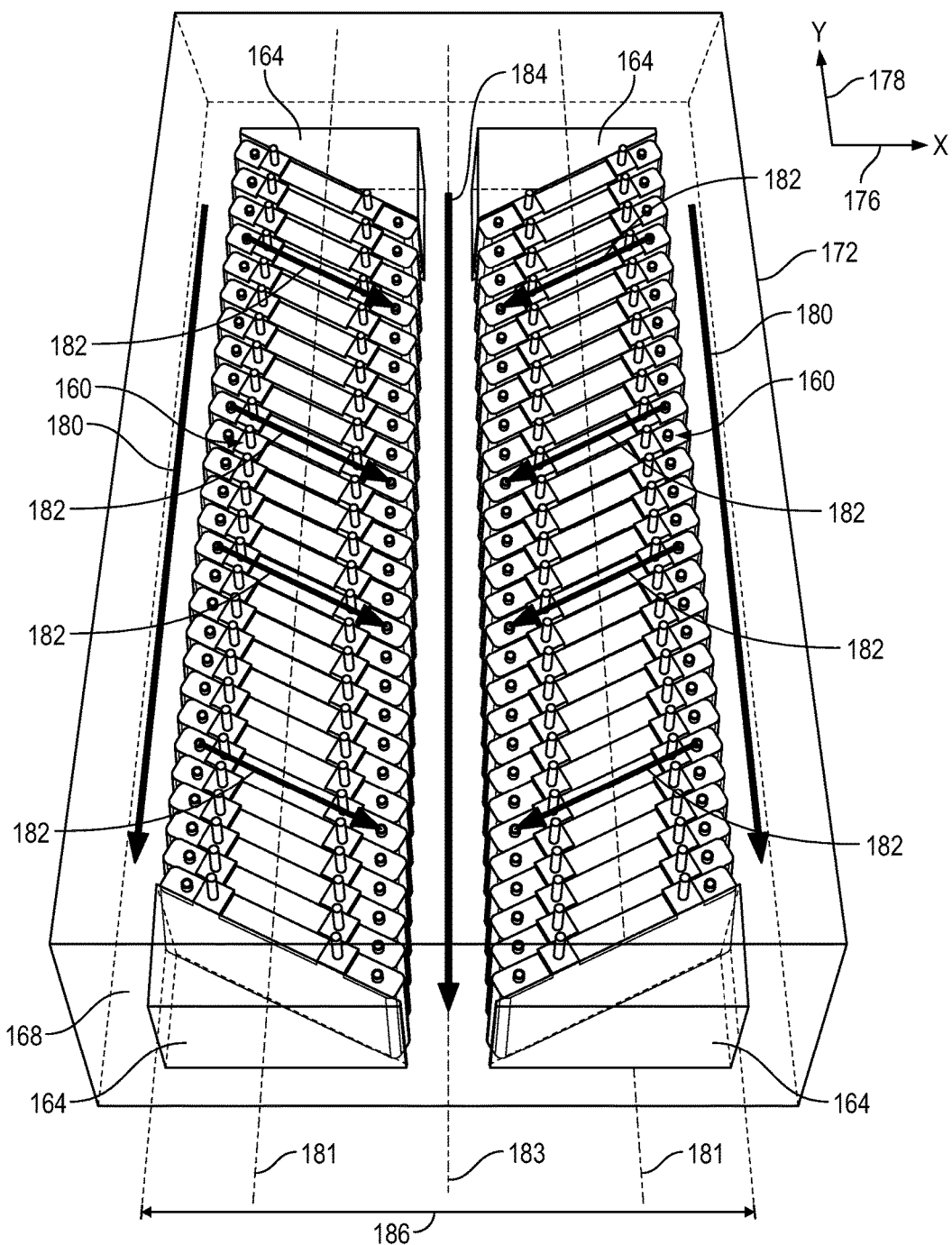
FIG. 4A is a perspective view of a portion of another traction battery assembly which may include an air thermal management system.
Figure 4B:
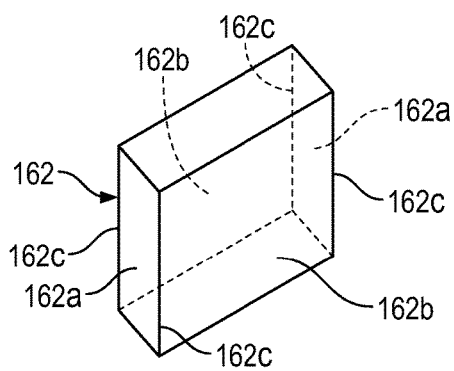
FIG. 4B is a perspective view of a battery cell from the portion of the traction battery assembly of FIG. 4A.

FIG. 4A shows an example of a portion of another traction battery assembly which may have an air thermal management system and a pair of angled battery cell arrays 160 spaced apart from one another. The battery cell arrays 160 may include a plurality of battery cells 162 as shown in FIG. 4B. Each battery cell 162 may include a pair of opposing side faces 162a and a pair of opposing front faces 162b. Each battery cell 162 may also include four vertical edges 162c. A pair of endplates 164 may be located at longitudinally opposing ends the battery cell arrays 160 and may assist in retaining the battery cells 162 therebetween. For example, the endplates 164 may be arranged with the respective battery cell arrays 160 such that a compression force is applied to the battery cells 162. The battery cell arrays 160 may be supported by a support component, such as a battery tray 168. The battery cell arrays 160 may also be supported and retained by spacers, retaining features, and/or rails mounted to the battery tray 168 and the endplates 164 as further described below. A portion of a traction battery housing 172 is shown which may house the battery cell arrays 160 and the endplates 164. An X-direction arrow 176 represents a forward and rear direction of a vehicle including the battery cell arrays 160. A Y-direction arrow 178 represents a side to side direction of the vehicle. In this example and in contrast to the example shown in FIG. 3A, the battery cells 162 of the battery cell arrays 160 are oriented in a fletched formation for cooling by the air thermal management system.

For example, in the fletched formation the battery cells 162 may be stacked such that centers of the battery cells 162 are aligned along a longitudinal array center axis 181 and such that outer portions of the battery cells 162 form step configurations extending along longitudinal sides of the batter cell arrays 160. In this example, the side faces 162a, front faces 162b, and vertical edges 162c may at least partially define the step configuration of the outer portions of the battery cells 162. A "step configuration" as used herein does include square wave configurations.

In the fletched formation, the battery cells 162 may be arranged to define a plurality of passageways between one another which may be diagonally oriented relative to the longitudinal array center axis 181. The passageways may provide a path for airflow to assist in thermal management of the battery cells 162 and/or may provide space for cell spacers. For example, an inlet (not shown) of the traction battery housing 172 may be in fluid communication with the passageways such that air flows longitudinally from the inlet and then flows diagonally between the battery cells 162 relative to the longitudinal array center axis 181. The battery cells 162 may be oriented at an acute angle relative to an assembly centerline axis 183 between the arrays and extending parallel to the longitudinal array center axes 181.

Figure 4C:
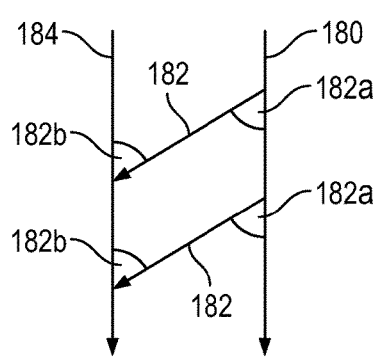
FIG. 4C is an illustrative plan view of a portion of the traction battery assembly of FIG. 4A showing examples of airflow paths.

Arrows 180 show examples of airflow paths entering the traction battery housing 172 and traveling in the Y-direction. Arrows 182 show examples of airflow paths traveling across and between the battery cells 162 corresponding to an angle of the orientation of the battery cells 162 to, for example, assist in cooling the battery cells 162. As shown in this example and as further illustrated in FIG. 4C, the airflow navigates an approximately sixty degree turn (represented as an angle 182a) to travel across and between the battery cells 162 in the fletched formation. In comparison to the ninety degree angle as shown in the example in FIG. 3A, airflow may be enhanced in the fletched formation with a turn angle less than ninety degrees at which airflow navigates from the Y-direction to cool the battery cells 162. The reduced angle at which airflow navigates from the Y-direction may also decrease an overall pressure drop of the system since the angle of change by which the air flows through the battery cell arrays 160 is decreased. Arrow 184 shows an example of an airflow path for air flowing across and between the battery cells 162 en route to exiting the traction battery housing 132 in the Y-direction after navigating a substantially thirty degree turn (represented as an angle 182b) from the air travel across the battery cells 162. While the angles 182a and 182b are referenced as approximately sixty degrees and thirty degrees, respectively, it is contemplated that other configurations of the battery cells 162 are available which may utilize alternative angles for turns which airflow may travel to assist in cooling the battery cells 162.

Figure 4D:
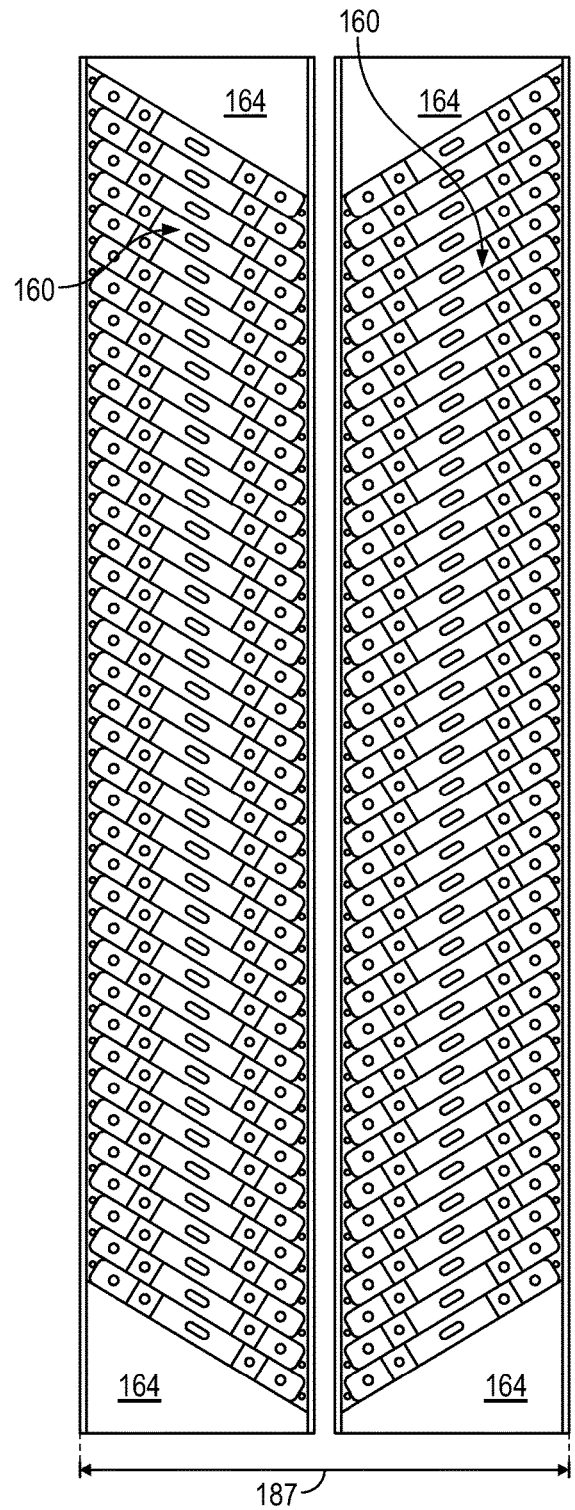
FIG. 4D is a plan view of a portion of another traction battery assembly which may include a liquid thermal management system.

The fletched formation of the battery cells 162 may reduce packaging space when compared with the rectangular formation of the battery cells 122. For example, the two battery cell arrays 160 may define an X-length equal to a dimension 186. Assuming the battery cells 122 and the battery cells 162 are the same size, dimension 186 is less than dimension 150. The shorter dimension 186 may provide additional traction battery placement options within the vehicle. For example, vehicles with narrow rear seats may not provide enough space to place a traction battery therebelow. In these types of vehicles, the traction battery including the rectangular formation of battery cell arrays 120 as shown in FIG. 3A may not be suitable whereas the traction battery including the fletched formation of battery cell 162 may be suitable. FIG. 4D shows the battery cell arrays 160 in a configuration which may be suitable for a liquid thermal management system in which the battery cell arrays 160 are closer to one another than when utilized with the air thermal management system, thus dimension 187 may be less than dimension 150 and dimension 186. In this example, the battery tray 168 may include a recess to receive a thermal plate (not show) for use with the liquid thermal management system. The thermal plate may be in thermal communication with the battery cells 162 to dissipate heat therefrom.

The battery cell arrays 160 in the fletched formation may also include structural components to assist in delivering compression to the battery cells 162. These components may assist in preventing slippage of the battery cells 162 by providing structural reinforcement under certain conditions relating to the angle of orientation of the battery cells 162.

Figure 6B:
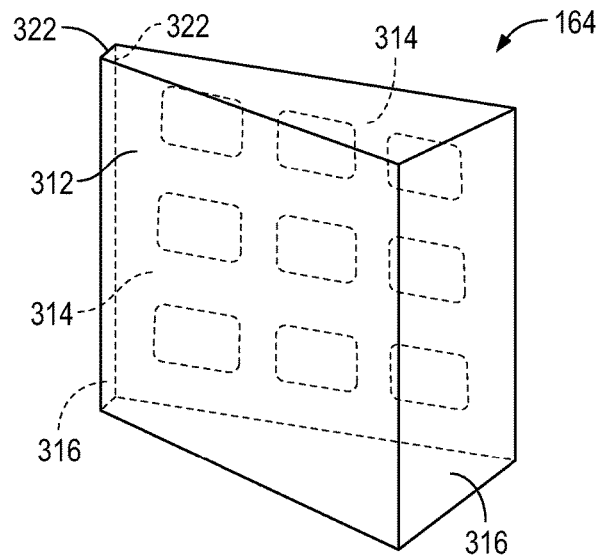
FIG. 6B is a perspective view of another endplate of the support structure of FIG. 5.
Figure 6C:
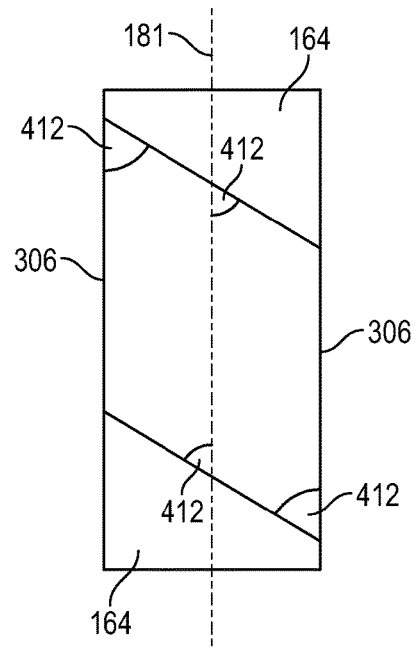
FIG. 6C is an illustrative plan view of the support structure of FIG. 5 showing examples of angles of orientation for portions of the endplates of FIGS. 6A and 6B.

FIG. 5 shows an example of a support structure 300 to support and retain the cell arrays 160. The support structure 300 may include the pair of endplates 164, a pair of upper retention supports 306, and a pair of lower retention supports 308 (only one of the lower retention supports 308 is visible in FIG. 5). FIGS. 6A and 6B are perspective views of the endplates 164. The endplates 164 may have a triangular prism shape or wedge shape and may each include an inner face 312, an outer face 314, and side faces 316. A "prism shape," whether triangular or rectangular, as used herein as a reference to a component does not necessarily denote a geometrically perfect prism shape. For example, features or elements, such as recesses, extrusions, or manufacturing imperfections, of the component may be such that the component has an overall prism shape, but not necessarily a geometrically perfect prism shape. While FIGS. 6A and 6B show the endplate 164 with two side faces 316, it is contemplated that a configuration of the endplate 164 may include only one side face 316 such that a plan view of the endplate 164 resembles a triangle. The inner faces 312 of the endplates 164 may define planes parallel to one another. "Parallel" as used herein to reference orientations between components or axes does not necessarily denote geometrically perfect parallelism. For example, components may be slightly skewed during, for example, an assembly processes and may thus be substantially parallel to one another instead of geometrically perfectly parallel. The inner faces 312 may be oriented at an angle 412 relative to the longitudinal array center axis 181 or the upper retention supports 306 or the lower retention supports 308 as shown in FIG. 6C. The angle 412 may be an acute angle. The outer faces 314 of the endplates 164 may define planes parallel to one another. The endplates 164 may each define a pair of inner upper corners 322. The upper retention supports 306 may span between the inner upper corners 322 of the endplates 164. It is contemplated that the upper retention supports 306 and the lower retention supports 308 may be comprised of more than one interlocking component or may be a single component. For example, upper and lower support rails may be utilized with the support structure 300 to span between the endplates 164. These upper and lower rails may define the respective spacer guides 332, cell guides 336, and shingle fittings 354. Alternatively, the spacer guides 332, cell guides 336, and shingle fittings 354 may be secured to the respective upper retention support 306 and lower retention support 308.

The endplates 164 and the upper retention supports 306 and/or the lower retention supports 308 may define a rectangular prism. The endplates 164, the upper retention supports 306, and the lower retention supports 308 may be arranged with one another to create compression forces against the battery cells 162 and to retain the battery cells 162 therebetween. The upper retention supports 306 and the lower retention supports 308 may include guides to assist in orienting the battery cells 162 and a plurality of cell spacers 330 at an angle parallel to an angle of orientation of the inner faces 312 of the endplates 164.

Figure 7A:
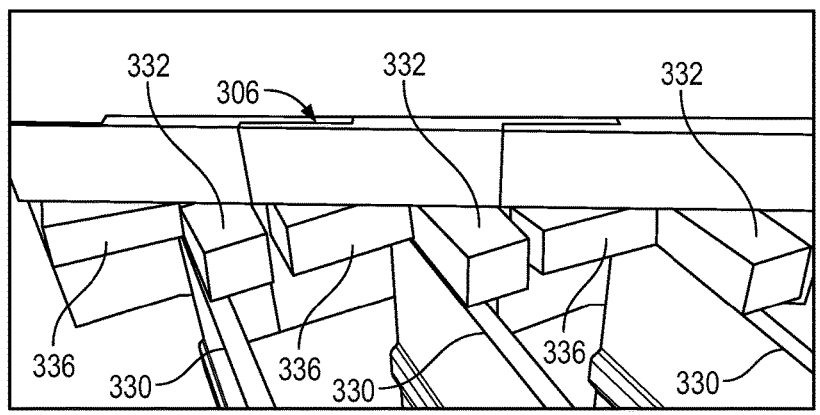
FIG. 7A is a perspective view of a portion of an upper retention support of the support structure of FIG. 5.
Figure 7B:
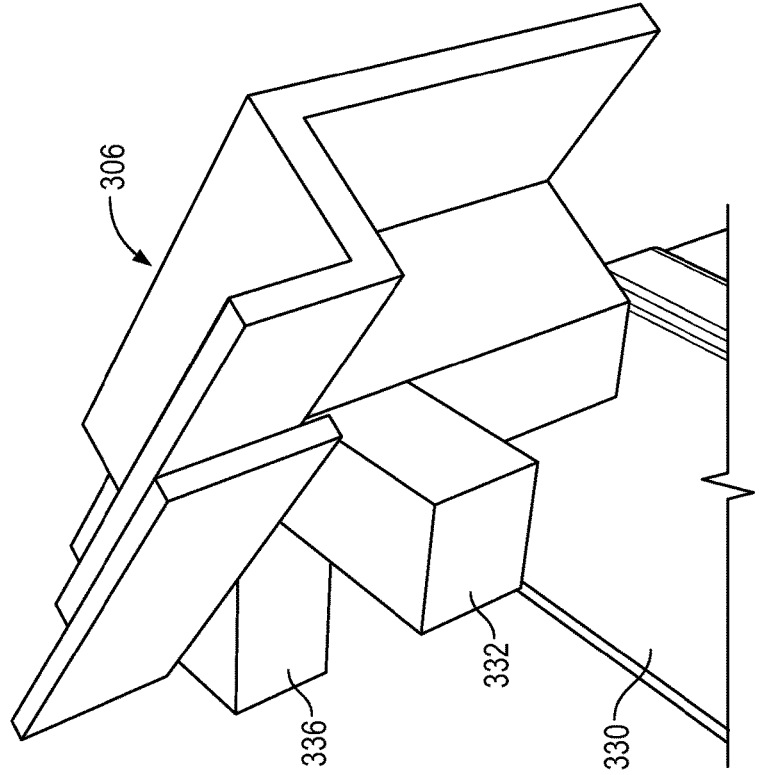
FIG. 7B is a detailed perspective view of a portion of the upper retention support of FIG. 7A.

For example, FIGS. 7A and 7B show an example of spacer guides 332 and cell guides 336 defined by a portion of the upper retention supports 306. The spacer guides 332 may be sized to receive and orient a portion of an upper corner of one of the cell spacers 330 at an angle parallel to the angle of the inner faces 312 of the endplates 164. The spacer guides 332 and the cell guides 336 may be extensions from the upper retention supports 306 which may contact and retain the cell spacers 330 and the battery cells 162, respectively. Alternatively, the spacer guides 332 and the cell guides 336 may be, for example, notches or cavities in the upper retention supports 306. The cell guides 336 may be sized to receive and orient a portion of an upper corner of the battery cells 162 at an angle parallel to the angle of the inner faces 312 of the endplates 164. The spacer guides 332 and the cell guides 336 may be arranged with one another and spaced apart such that passageways are defined between the cell spacers 330. The battery cells 162 may be disposed within at least a portion of the passageways and the passageways may also provide a path for air to flow and assist in cooling the battery cells 162 in certain thermal management systems such as an air thermal management system.

Figure 8:
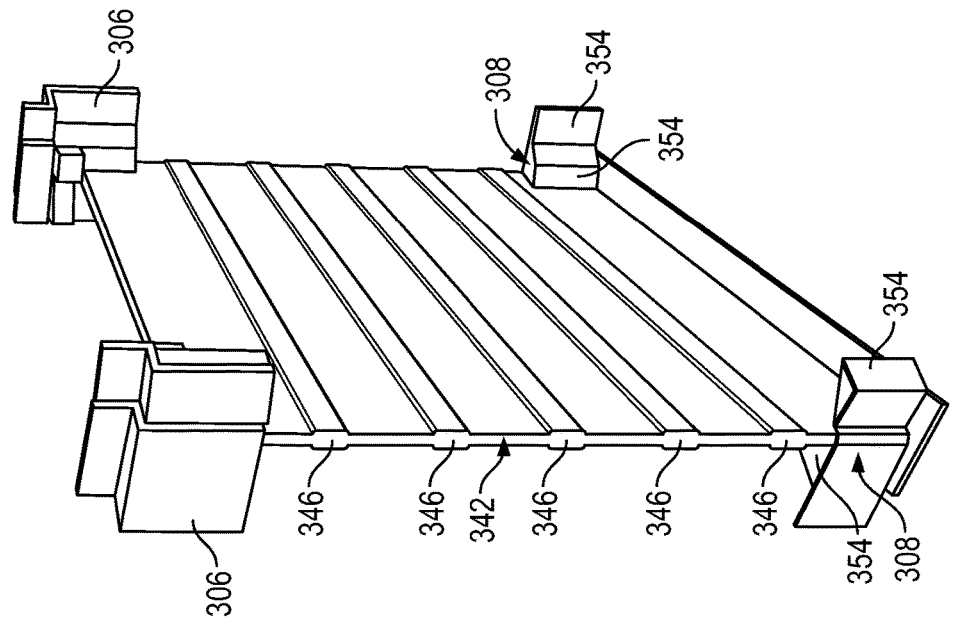
FIG. 8 is a perspective view of a cell spacer which may be used with an air thermal management system shown retained by portions of the support structure of FIG. 5.

FIG. 8 shows an example of an air system spacer 342 shown retained between portions of the upper retention supports 306 and the lower retention supports 308. The air system spacer 342 may be utilized with an air cooled thermal management system. The air system spacer 342 may define one or more ribs 346. The ribs 346 may extend across the air system spacer 342 and assist in defining paths or passageways for airflow between the air system spacer 342 and the adjacent battery cells 162. A base support 348 may retain a bottom portion of the air system spacer 342 and also assist in containing airflow within the passageways. The base support 348 may also operate as an electrical isolator for the battery cells 162.

Figure 9:
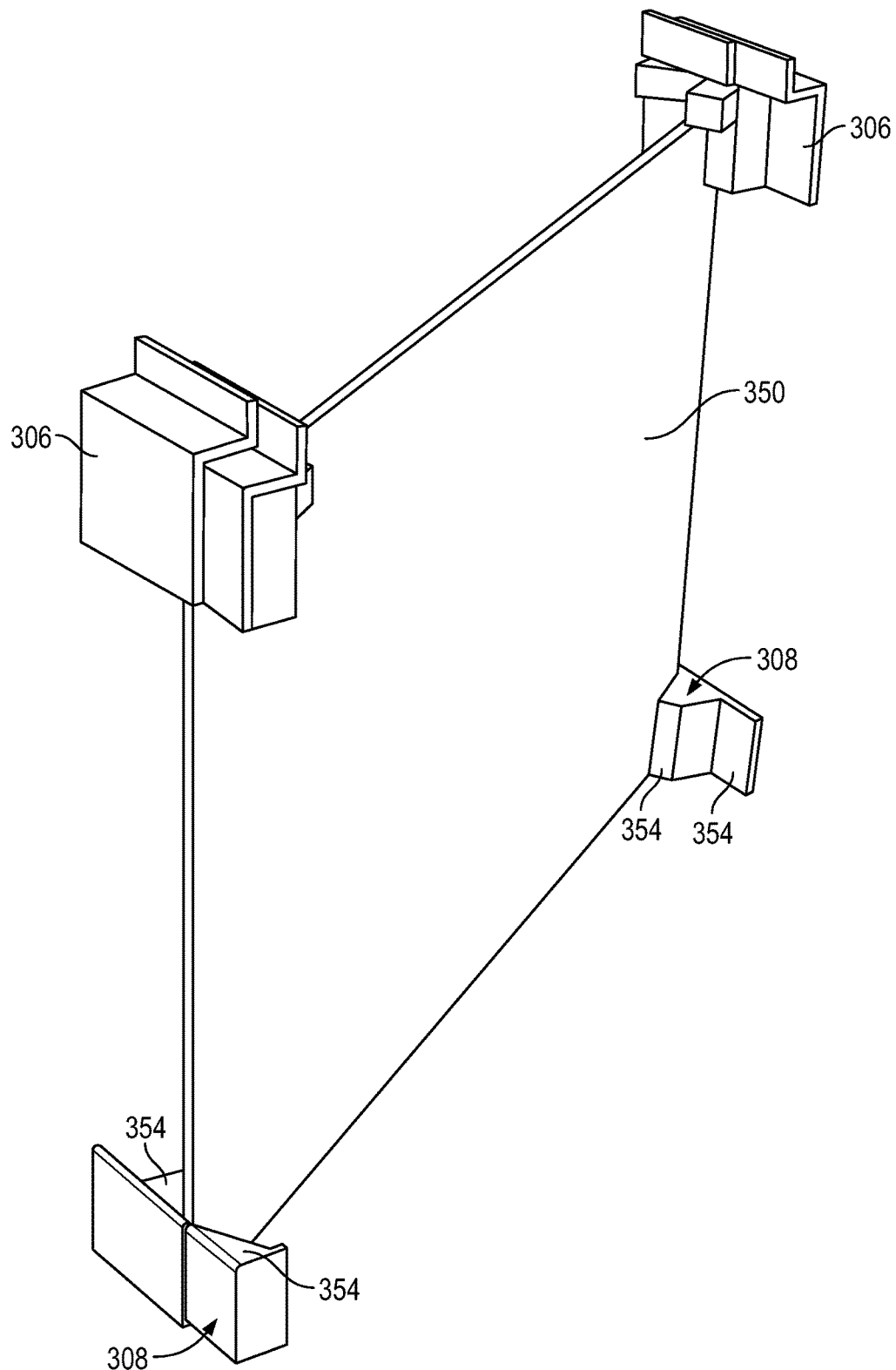
FIG. 9 is a perspective view of another cell spacer which may be used with a liquid thermal management system shown retained by portions of the support structure of FIG. 5.

FIG. 9 shows an example of a liquid system spacer 350 shown retained between portions of the upper retention supports 306 and the lower retention supports 308. The liquid system spacer 350 may be utilized with a liquid cooled thermal management system. A bottom portion of the liquid system spacer 350 may contact a supporting surface, such as a thermal plate (not shown), to assist in dissipating heat from the battery cells 162 to the thermal plate. Shingle fittings 354 may extend from the lower retention supports 308 as shown in FIGS. 8 and 9. The shingle fittings 354 may be sized to receive lower corner portions of the air system spacers 342, the liquid system spacers 350, and the battery cells 162. The shingle fittings 354 may assist the spacer guides 332 and the cell guides 336 in retaining the cell spacers and battery cells 162 to prevent or minimize slippage of the battery cells 162 under certain conditions.

Figure 10:
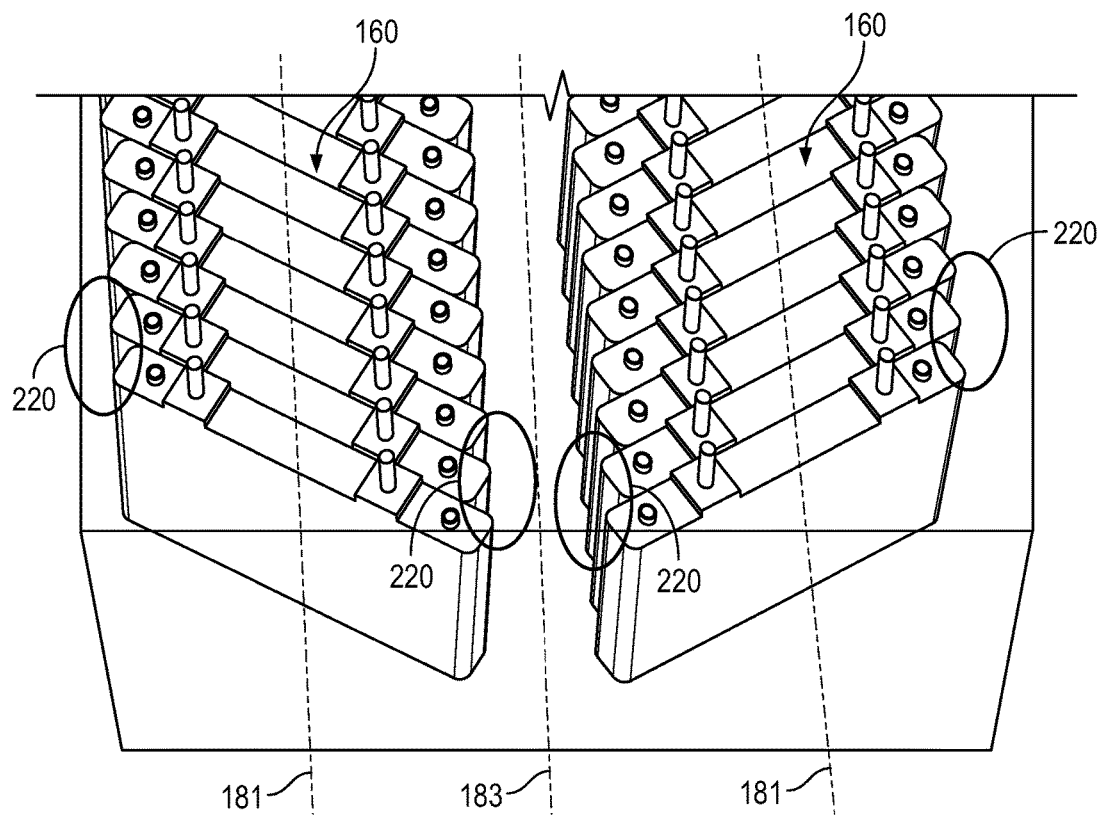
FIG. 10 is a detailed perspective view of a portion of the traction battery assembly of FIG. 4A showing regions of battery cell arrays which may require additional retention support due to a fletched formation of the battery cells.
Figure 11:
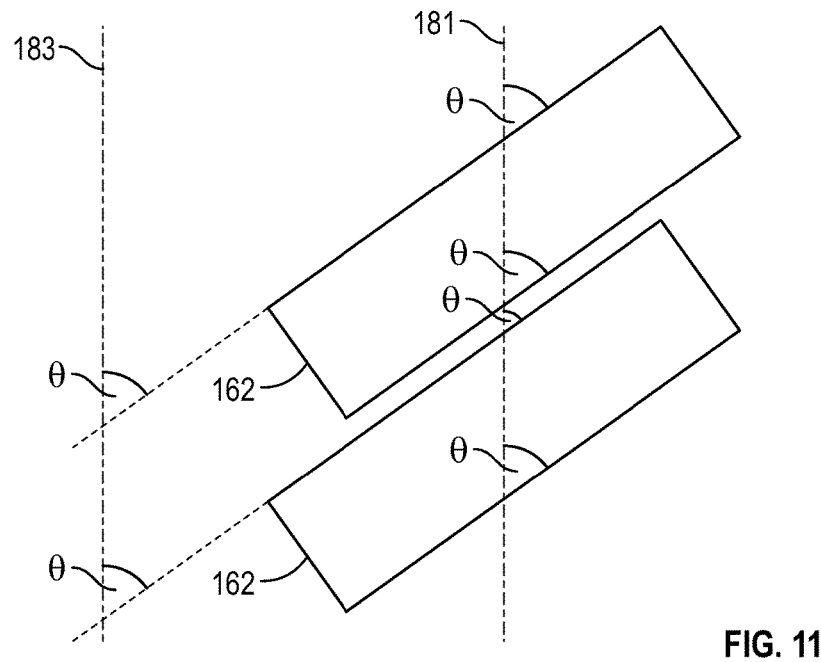
FIG. 11 is an illustrative plan view of two battery cells showing examples of angles of orientation of the battery cells

For example, FIG. 10 shows a detailed view of a portion of the battery cell arrays 160 which includes areas or regions 220 where the upper retention supports 306 may assist in preventing or minimizing slippage of the battery cells 162 when oriented in the fletched formation. In these regions 220, an angle of orientation of the battery cells 162 may be such that the battery cells 162 slip under compression forces applied to the battery cells 162. For example, FIG. 11 shows an illustrative plan view of two of the battery cells 162 oriented in the fletched formation. The battery cells 162 may be oriented at an angle Θ relative to the opposing front faces 162b of the battery cells 162 and the longitudinal array center axis 181. The angle Θ may be based on a coefficient of friction of a surface supporting the battery cells 162 and the compression forces applied to the battery cells 162 for retention purposes. For example, friction may fail to stabilize the battery cells 162 when under compression and beyond certain degree values for the angle Θ. Degree values for the angle Θ under which the battery cells 162 are stable when compression forces are applied may be referred to as a stable angle value. Degree values for the angle Θ under which the battery cells 162 slip when compression forces are applied may be referred to as a slippage angle value. The angle Θ may have different stable angle values and slippage angle values for different traction battery assemblies due to varying coefficients of friction for the surfaces supporting the battery cells 162 and varying compressional forces which may be applied to the battery cells 162. In one example, the angle Θ is between ninety degrees and 68.2 degrees.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A support structure for a battery cell array comprising:
   a pair of triangular prism shaped endplates having opposing parallel inner faces configured to exert a compression force on battery cells disposed therebetween and parallel outer faces not parallel with the inner faces; and
   a pair of opposing retention supports each spanning between the endplates and defining a retention feature having an inner corner portion, a spacer guide portion to orient a cell spacer corner portion for parallel alignment with the inner faces, and a cell guide portion having to receive and orient a cell corner portion for parallel alignment with the inner faces.

2. The support structure of claim 1, wherein the inner faces are oriented at an acute angle relative to at least one of the supports, and wherein the acute angle has a slippage angle value.

3. The support structure of claim 2, wherein the slippage angle value is based on a surface coefficient of friction of a battery tray arranged to support the battery cells and an amount of the compression force.

4. The support structure of claim 1, further comprising a plurality of cell spacers disposed between the endplates having corners oriented by the spacer guides, wherein each of the cell spacers defines a plurality of ribs spaced apart at intervals and extending outward on both sides of the spacer.

5. The support structure of claim 1, further comprising:
   a thermal plate disposed below a battery cell region between the endplates; and
   a plurality of cell spacers disposed between the endplates and having upper corners retained by the spacer guides and lower corners in at least partial contact with the thermal plate, and oriented such that the spacers are parallel to the inner faces.

6. A battery cell array support structure comprising:
   wedge shaped endplates each having inner corners; and
   retention supports extending between the inner corners, each defining a spacer guide portion to orient a cell spacer corner portion for parallel alignment with inner endplate faces, and a cell guide portion to receive and orient a cell corner portion for parallel alignment with the inner endplate faces to exert a compression force on battery cells disposed therebetween.

7. The support structure of claim 6, wherein the endplates each further have outer faces parallel to one another, inner faces parallel to one another and oriented at an acute angle relative to the respective outer faces, at least one side face extending between the outer and inner endplate faces, and upper faces, and wherein the inner corners are each defined by an intersection of the respective inner endplate face, upper face, and side face.

8. The support structure of claim 7, further comprising:
   a pair of outer spacers each adjacent to the respective inner faces, oriented parallel to the inner faces, and at least partially disposed within four of the spacer guides adjacent the inner corners of the endplates; and
   a plurality of inner spacers spaced apart at intervals between the pair of outer spacers, oriented parallel to the inner faces, and at least partially disposed within the other of the spacer guides between the four of the spacer guides adjacent the inner corners.

9. The support structure of claim 8, wherein the endplates and retention supports are arranged to retain and orient the battery cells such that the battery cells are parallel to the inner faces.

10. The support structure of claim 6, wherein the endplates each define an inner face oriented at an angle relative to the retention supports equal to a slippage angle value dictated by a surface coefficient of friction of a battery tray arranged to support the battery cells and an amount of the compression force.

11. The support structure of claim 10, wherein the retention supports orient the cell spacers such that the cell spacers are oriented at the angle and such that passageways defined between the cell spacers provide a path for airflow.

12. A traction battery assembly comprising:
   a pair of endplates each having a triangular prism shape;
   a pair of upper rails extending between each of the endplates, defining a plurality of first guides sized to receive a portion of an upper corner of a spacer and a cell guide portion to receive and orient a cell corner portion for parallel alignment with inner endplate faces, and covering portions of first and second battery cell faces; and
   a plurality of cell spacers disposed between the endplates, diagonally arranged such that the spacers are oriented at an acute angle relative to the upper rails and such that at least a portion of the upper corners of the spacers are retained by the first guides.

13. The assembly of claim 12, wherein the cell spacers are arranged to define a plurality of airflow passageways between one another and diagonally oriented relative to the upper rails.

14. The assembly of claim 12, further comprising a pair of lower rails extending between each of the endplates and defining a plurality of shingle fittings sized to receive a portion of a lower corner of a battery cell.

15. The assembly of claim 12, further comprising a pair of lower rails extending between each of the endplates and defining a plurality of shingle fittings sized to receive a portion of a lower corner of a spacer.

16. The assembly of claim 12, wherein the acute angle has a slippage angle value based on a surface coefficient of friction of a battery tray supporting the assembly and an amount of compression force applied by the endplates to a plurality of cells disposed therebetween and supported by the battery tray.

* * * * *